Feb. 9, 1960 C. DJUVIK 2,923,965
PELLETIZING APPARATUS
Filed March 29, 1956 2 Sheets-Sheet 2

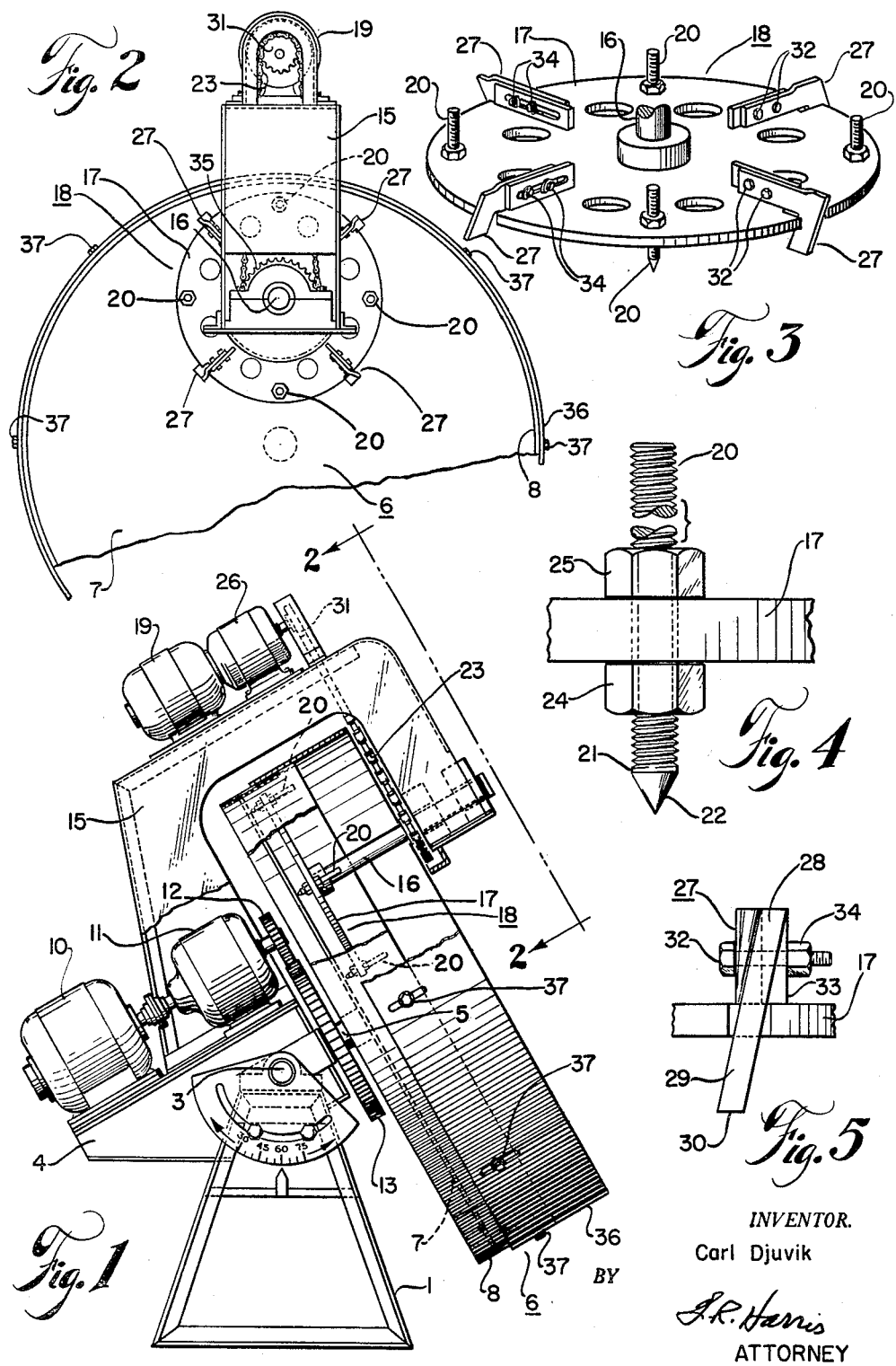

INVENTOR.
Carl Djuvik
BY
J.R. Harris
ATTORNEY

United States Patent Office 2,923,965
Patented Feb. 9, 1960

2,923,965

PELLETIZING APPARATUS

Carl Djuvik, Star Lake, N.Y., assignor to Jones & Laughlin Steel Corporation, Pittsburgh, Pa., a corporation of Pennsylvania Application March 29, 1956, Serial No. 574,690

7 Claims. (Cl. 18—1)

My invention relates to apparatus for agglomerating finely divided material, such as ores, into pellets or nodules. More particularly, it is concerned with a rotary disk type of pelletizer provided with improved scraper means.

A form of apparatus which is used for pelletizing ores and the like is the rotary disk pelletizer which consists of a relatively large diameter disk provided with a shallow circumferential wall, the apparatus being rotated about an axis perpendicular to the center of the disk and inclined to the horizontal. When finely divided, moistened material is fed to the disk, it tends to stick to the surfaces with which is comes in contact. Under some circumstances it is desirable to keep the surfaces clean and the material must, therefore, be scraped off. Under other conditions it is desired to maintain an even layer of the finely divided material over such surfaces and means must therefore be provided to keep such a layer uniform in thickness.

It is an object of my invention to provide a rotary disk type of pelletizing apparatus provided with an improved form of scraper. It is a further object to provide such apparatus employing a rotary scraper. It is a further object to provide apparatus of this type having readily adjustable scraper tools. It is a still further object to provide a rotary disk type of pelletizing apparatus having rerolling steps with a plurality of rotary scrapers, one for the disk surface proper and one for each rerolling step. Other objects of my invention will become evident from the description to follow.

A present preferred embodiment of my invention is illustrated in the attached figures to which reference is now made.

Fig. 1 is an elevation partly in section of apparatus embodying my invention.

Fig. 2 is a view of a portion of the apparatus shown in Fig. 1 taken on the plane 2—2 of Fig. 1.

Fig. 3 is an enlarged detail view in perspective of a portion of a rotary scraper assembly of my invention.

Fig. 4 is an enlarged detail of a scraper tool.

Fig. 5 is an enlarged detail view of another form of scraper tool.

Figures 6, 7:
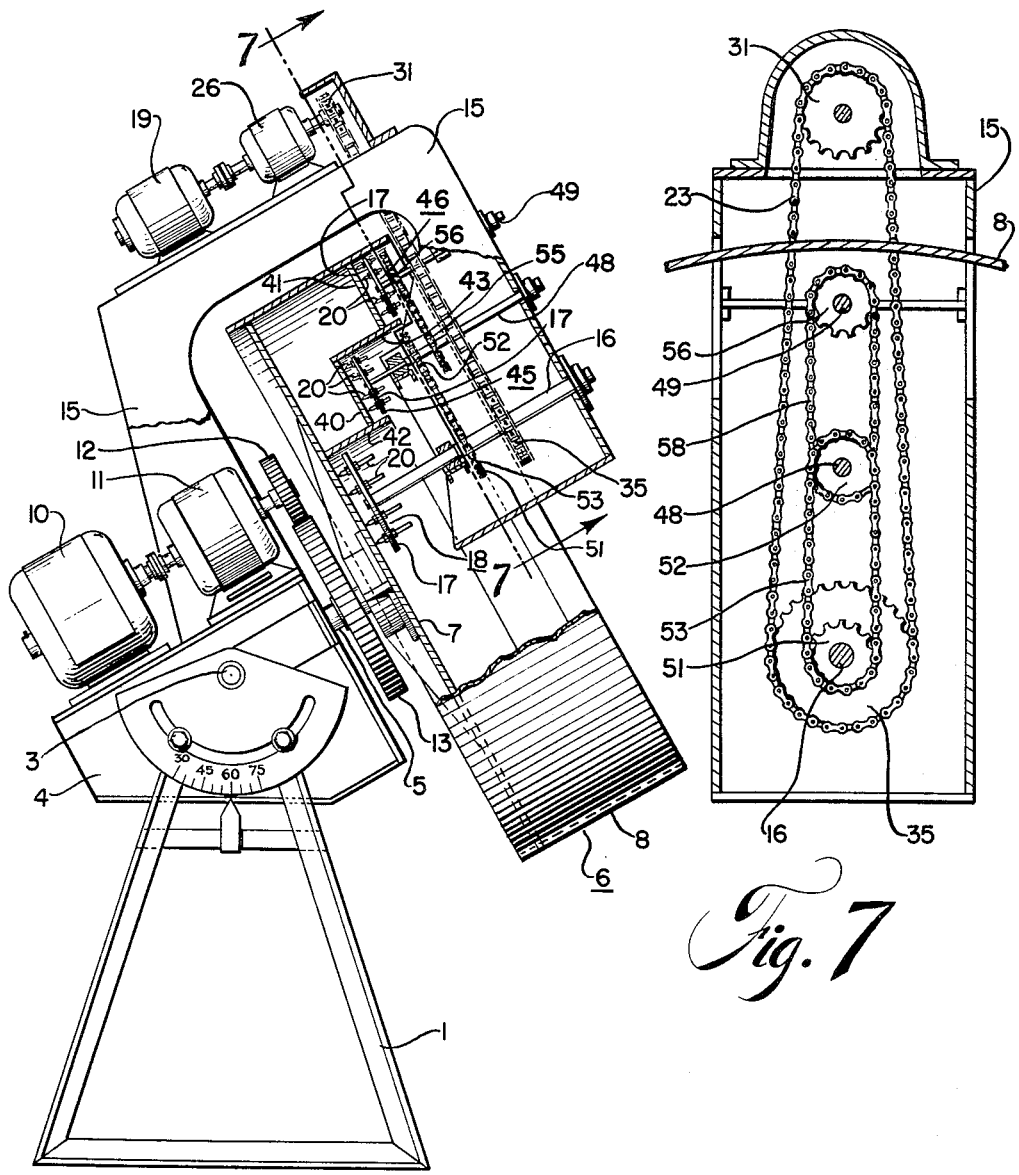
Fig. 6 is an elevation partly in section of a modified form of apparatus embodying my invention.
Fig. 7 is a section of the apparatus of Fig. 6 taken through the plane 7—7 of Fig. 6.

In the description to follow, I refer first to the apparatus as shown generally in Fig. 1. My apparatus is mounted upon a base element 1 of heavy construction in which is journaled a horizontal shaft 3. Fixed to horizontal shaft 3 is a rigid mounting assembly 4 in which is journaled a shaft 5, the axis of which is perpendicular to that of shaft 3. Shaft 5 supports rotary disk element 6 which has a circular base 7 and a low circumferential wall or rim 8. Shaft 5 is affixed to circular base 7 at its center.

Mounting assembly 4 supports a source of power such as electric motor 10 which drives through speed reducer 11, a pinion 12 which meshes with a gear 13 rigidly attached to shaft 5 below circular base 7. Mounting assembly 4 also carries a heavy inverted U-shaped bracket 15 which extends out over rotary disk 6 and down in front of the open end of that disk. In the outer leg of bracket 15 is journaled shaft 16, the axis of which is parallel to that of shaft 5. Shaft 16 extends inwardly toward rotary disk 6 and is provided at its inner end with a rotary scraper assembly designated generally 18. Rotary scraper assembly 18 comprises a circular plate or spider 17, the surface of which is parallel with that of circular base 7, together with tools to be described. Upon the uppermost surface of bracket 15 is mounted driving means such as an electric motor 19 which drives through speed reducer 26 a sprocket 31, which, through a roller chain 23 or similar means, drives a second sprocket 35 fixed rigidly to shaft 16.

Near the periphery of spider 17 is positioned a number of equally spaced scraper tools 20—20. Each of these tools consists of a threaded rod 21 having a pointed scraping end 22, a lower nut 24, and an upper nut 25. Rod 21 passes through a hole in spider 17, and lower and upper nuts 24 and 25 are screwed against spider 17 to lock rod 21 in place. The distance which the pointed end 22 of rod 21 projects toward circular base 7 can be varied by adjusting the positions of nut 24 and nut 25 upon rod 21.

In Figs. 2 and 3, spider 17 is also shown as provided with a plurality of tools 27—27 which project radially outwardly. Each tool 27 comprises a tool element 28 which has an end scraping face 29 and may also have a bottom scraping face 30. Each tool 27 is mounted by a pair of bolts 32—32 which extend through a slot in an upright member 33 affixed to the upper surface of spider 17. Bolts 32—32 are fastened at their opposite ends with nuts 34—34. When nuts 34—34 are loosened, the tool element 28 can be moved radially outwardly or inwardly so as to adjust the distance between its end face 29 and the peripheral rim 8 of the rotary disk 6. Spider 17 may be provided with slots into which end faces 29—29 of tools 27—27 may be withdrawn for maximum clearance.

The rotary disk 6 may also be provided with an auxiliary rim element 36 which can be adjusted to extend out beyond low rim 8. Rim 36 is held in place by screws 37—37 which pass through slots in rim 36 and are tapped into the wall of low rim 8.

Fig. 6 illustrates a rotary disk type scraper provided with two rerolling steps, the scraper disk proper and each rerolling step being equipped with a rotary scraper assembly as previously described. Rotary disk 6 is provided as before with a circular base 7. Near the circumference of disk 6, however, circular base 7 is formed with a raised annular step or plane surface 40 which is parallel to base 7. A second raised annular step or plane surface 41 adjoins step 40 and is spaced from base 7 a distance greater than is step 40 so that rotary disk 7 has two rerolling steps around its circumference. The space between step 40 and base 7 is closed by cylindrical element 42 fixed perpendicular to base 7 and extending somewhat above step 40. Likewise, the space between steps 40 and 41 is closed by cylindrical element 43 which extends somewhat above step 41. Rerolling steps 40 and 41 are thus in effect shallow, flat-bottom, annular channels. Rerolling step 40 is equipped with a rotary scraper assembly designated 45 which is identical in construction with rotary scraper assembly 18 previously described. Likewise, rerolling step 41 is provided with a rotary scraper assembly designated generally 46 which is also identical in design with rotary scraper assembly 18 previously described. Rotary scraper assembly 45 is dimensioned to fit the width of rerolling step 40 and rotary scraper assembly 46 is dimensioned to fit the width of rerolling step 41. Rotary scraper assemblies 45 and 46 are each provided with a circular plate or spider 17 and each plate 17 supports a plurality of scraper tools 20. Rotary scraper assembly 45 is carried by shaft 48 and rotary scraper assembly 46 is carried by shaft 49 each of which is journaled in U-shaped bracket 15. Shaft 48 is positioned so that its axis bisects the width on radius of rerolling step 40 and shaft 49 is likewise positioned so that its axis bisects the width on radius of rerolling step 41. Shaft 16 of rotary scraper 18 carries a sprocket 51 and shaft 48 of rotary scraper 45 carries a similar sprocket 52. Sprockets 51 and 52 are connected with roller chain 53. Shaft 48 also carries a second sprocket 55 and shaft 49 a like sprocket 56 which are connected by a roller chain 58.

It is believed the above description also makes clear the operation of my device. Motor 10 through speed reducer 11 and gears 12 and 13 causes rotary disk 6 to rotate at a relatively slow speed on shaft 5. The plane in which rotary disk 6 rotates may be inclined in any desired degree by tilting mounting assembly 4 on horizontal shaft 3. Once tilted, the apparatus is locked in place by suitable means not shown. Finely divided, moistened material, such as iron ore, is placed upon the circular base 7 of the rotary disk element 6 and is prevented from falling off by the rim 8 and extension rim 36, if necessary. As rotary element 6 rotates slowly, the finely divided material is carried up by the rotation of the disk and tumbles back down as small pellets or balls, which pick up additional finely divided material as they roll over it. Rotary scraper assembly 18 is rotated by motor 19 through speed reducer 26, sprockets 31 and 35 and roller chain 23, at a speed comparable with that of rotary disk 6. The scraper tools 20—20 are set at the same distance from the surface of circular base 7 and therefore constantly scrape off all finely divided material which builds up beyond the thickness desired. The rotary action of the scraper, together with the rotation of the disk, permits excess material to be removed without tearing out material below the level of the desired layer. Furthermore, the finely divided ore does not stick to points 22—22 or build up on them.

In the embodiment of my apparatus shown in Fig. 6, the material formed into pellets or balls on circular base 7 is separated from the fines and transferred to the first rerolling step 40 when the pellets have reached a certain size, and is there rerolled. Rotary scraper assembly 45 operates to scrape the surface of rerolling step 40 in the same manner as rotary scraper assembly 18 above described operates on circular base 7. The pellets from first rerolling step 40 are then transferred to the second and last step 41 for final rolling and there rotary scraper assembly 46 operates in the same manner as rotary scraper assemblies 18 and 45 previously described. Rotary scraper assembly 45 is driven from shaft 16 of rotary scraper assembly 18 by means of sprockets 51 and 52 and roller chain 53. Rotary scraper assembly 46 is driven in turn by rotary scraper assembly 45 through sprockets 55 and 56 and roller chain 58. A great advantage of the apparatus of my invention is the relatively small amount of power required to drive the rotary scrapers. A conventional fixed scraper operating on a rotary disk with or without rerolling steps would exercise a severe braking effect on the disk which could be overcome only by a considerable increase in the size of the motor driving the disk. My scraper elements are driven by a relatively small motor consuming little power and do not necessitate a larger driving motor for the disk itself.

If scraper tools 27—27 are used, they are set so that their outer edges 29—29 are the same distance from the inside surface of circumferential wall 8. As is clearly shown in Figs. 3 and 5, the outer edge 29 of each scraper tool 27 is not perpendicular to spider 17 but is inclined somewhat so that its scraping action is of a sliding nature. The bottom faces 30—30 of scraper tools 27—27 also assist the action of scraper tools 20—20 in leveling the layer of material built up on disk 6. Normally, however, bottom edges 30—30 of tools 27—27 do not project as far toward circular base 7 as do the points 22—22 of scraper tools 20. It will be understood that rotary scraper assemblies 45 and 46 may be provided with scraper tools 27—27 in the same manner as rotary scraper assembly 18.

I claim:
1. Apparatus for pelletizing finely divided materials comprising a shallow cylindrical container rotatable about its axis, said container consisting of a circular end surface and a circumferential wall, means for supporting said container for rotation with its end surface inclined to the horizontal, rotatable scraper means comprising a spider positioned parallel to said end surface and a scraper tool fixed to said spider near its outer edge and projecting toward said end surface, and separate means for rotating said spider about an axis perpendicular to its center and spaced intermediate the axis of said cylindrical container and its upper edge.

2. Apparatus of claim 1 in which the scraper tool is adjustably fixed to said spider so that the distance it projects toward said end surface may be set at a predetermined value.

3. Apparatus of claim 1 in which the scraper tool projects toward said circumferential wall.

4. Apparatus of claim 1 in which the scraper tool projects toward said circumferential wall and is adjustably fixed to said spider so that the distance it projects toward said circumferential wall may be set at a predetermined value.

5. Apparatus for pelletizing finely divided materials comprising a shallow, cylindrical container rotatable about its axis, said container consisting of a circular end surface, an annular rerolling surface surrounding said end surface and spaced therefrom, and a circumferential wall, means for supporting said container for rotation with its end surface inclined to the horizontal, first rotatable scraper means comprising a spider positioned parallel to and over said end surface intermediate the container axis and the upper edge of the end surface and a scraper tool fixed to said spider near its outer edge and projecting toward said end surface, second rotatable scraper means comprising a spider positoned parallel to and over said rerolling surface intermediate the upper edge of the rerolling surface and the upper edge of the end surface and a scraper tool fixed to said spider near its outer edge and projecting toward said rerolling surface and means for rotating said spiders about parallel axes perpendicular to the centers thereof and spaced from the axis of said cylindrical container.

6. Apparatus of claim 5 in which the said second rotatable scraper means is adapted and adjusted to scrape substantially the entire said annular rerolling surface.

7. Apparatus of claim 5 in which the axis of said second rotatable scraper means is centrally positioned with respect to the width on radius of said annular rerolling surface.

References Cited in the file of this patent

UNITED STATES PATENTS

| | | |
|---|---|---|
| 2,162,782 | Middelboe | June 20, 1939 |
| 2,293,439 | Lloyd | Aug. 18, 1942 |
| 2,357,941 | Eirich et al. | Sept. 12, 1944 |
| 2,778,056 | Wynne | Jan. 22, 1957 |

OTHER REFERENCES

| | | |
|---|---|---|
| 915,072 | Germany | July 15, 1954 |
| 181,807 | Australia | Apr. 25, 1955 |